Jan. 10, 1939.  E. V. COLLINS  2,143,543
TERRACING IMPLEMENT
Filed July 23, 1937

Inventor
Edgar V. Collins
by Orwig & Hague Attys

Patented Jan. 10, 1939

2,143,543

UNITED STATES PATENT OFFICE 2,143,543

TERRACING IMPLEMENT

Edgar V. Collins, Ames, Iowa, assignor, by mesne assignments, to Iowa State College Research Foundation, Ames, Iowa, a corporation of Iowa Application July 23, 1937, Serial No. 155,263

5 Claims. (Cl. 97—225)

The object of my invention is to provide a terracing implement of simple, durable and inexpensive construction designed to be advanced by a tractor or other power and which, during a single advance movement over a pasture, will form a vertical cut in the sod, elevate both strips of sod adjacent the cut, move a furrow slice beneath the sod from one side of the cut to the other, replace the sod and firmly press it into position to thereby form two water retaining channels directly above a sub-soil that has been loosened, and whereby water retained in said channels will readily penetrate the sod and enter the loosened sub-soil to be thereby conserved, and further to replace the sod in such condition that during excessive rainfall the surplus water may flow over the channels without substantial erosion of the soil at the line where the sod has been cut.

Referring to the accompanying drawing.

Figure 5:
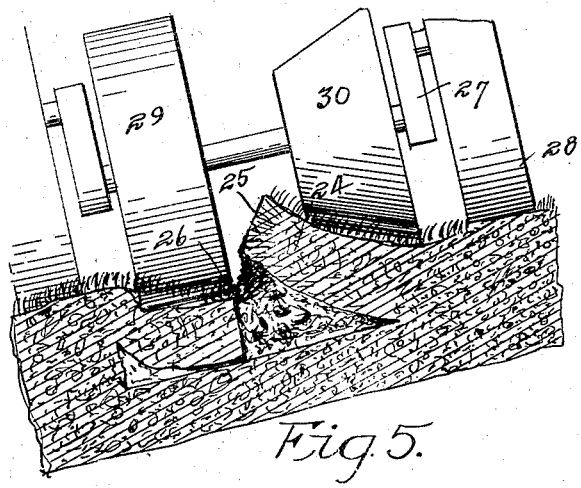
Figure 5 shows a vertical sectional view through the pasture strips and adjacent sub-soil illustrating the positions of same after the terrace has been formed by my improved implement. In this view the rollers for packing the pasture strips are also shown.
Figure 4:
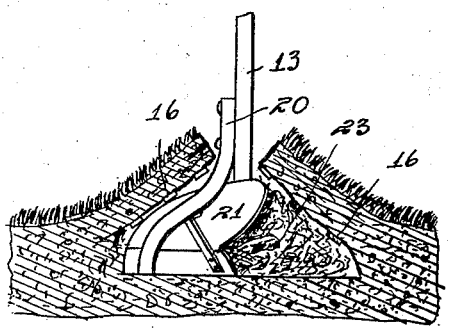
Figure 4 shows a rear elevation of the mould-boards and plow and illustrating the furrow slice formed by the plow and moved laterally from beneath one of the strips to position beneath the other.
Figure 2:
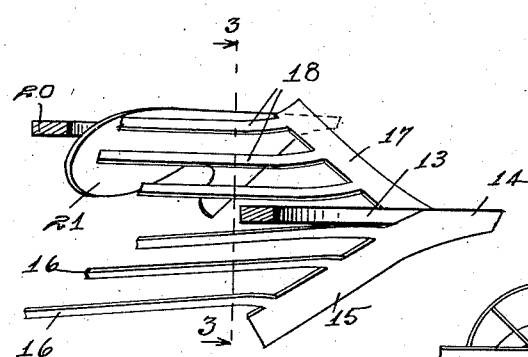
Figure 2 shows a top or plan view of the plow shares and mould-boards with the supporting beams therefor shown in section.

Referring to the accompanying drawing I have used the reference numeral 10 to indicate generally the main frame having supporting wheels 11. A lever 12 is provided for elevating and lowering the frame relative to the supporting wheels. This feature is of the ordinary construction and of itself forms no part of my present invention and is of the type now in common use.

Fixed to the frame 10 is a plow beam 13 having at its lower end a plow point 14 of ordinary construction. Connected with the plow point 14 is a plow share 15 of ordinary construction extended rearwardly and outwardly, and having a mould-board formed of longitudinally arranged slats 16 widely spaced apart. At the opposite side of the beam 13 is a second plow share 17 extended rearwardly and laterally in a direction opposite from the plow share 15, and connected with the plow share 17 is a mould-board formed of longitudinally arranged slats 18.

Supported upon the frame 10 in advance of the plow point 14 is a disc cutter 19 of ordinary construction and shaped to form a vertical cut in the pasture land directly in advance of the plow point 14. The shape of the mould-boards 16 and 18 is such that as the implement is being advanced over pasture land, the cutter 19 will form a vertical cut in the sod and the plow shares 15 and 17 will cut furrow slices horizontally and laterally in both directions, and the mould-boards will then elevate these furrow slices at an angle of about 45° from the horizontal in substantially the position shown in Figure 3, and when the mould-boards pass beyond the strips of sod thus elevated, they will return by gravity to substantially their original position without breaking the sod or turning it over.

Figure 3:
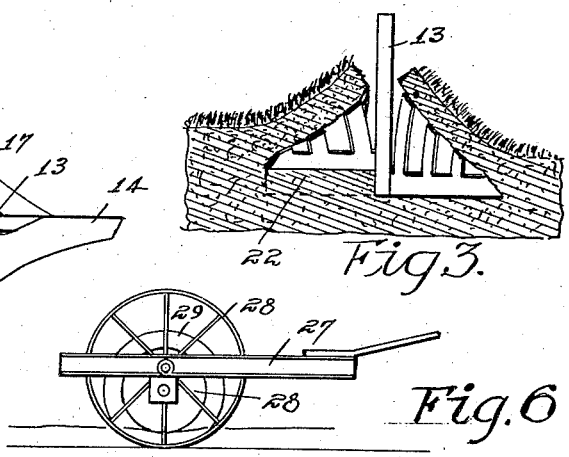
Figure 3 shows a vertical sectional view on the line 3—3 of Figure 2 illustrating the plow beam and the two mould-boards, and also illustrating the position of the pasture land strips when elevated to their maximum.
Figure 6:
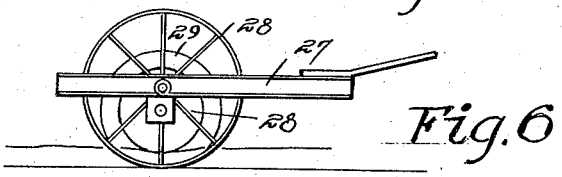
Figure 6 shows a detailed side elevation of the rollers and supporting frame.
Figure 1:
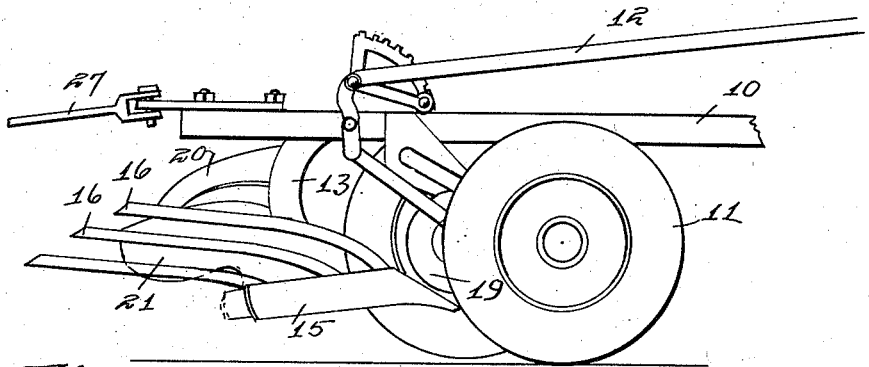
Figure 1 shows a side elevation of my improved terracing implement with the earth cutting and moving members in their elevated positions.

A second plow beam 20 is fixed to the frame 10 and extends downwardly in the rear of the mould-board 18 and has fixed to its lower end a plow indicated generally by the reference numeral 21. The position of this plow relative to the adjacent mould-board 18 is such that as the implement is being advanced, it will cut a furrow slice from beneath the path over which the plow share 17 has been advanced, and this furrow slice will be moved by the plow 21 to position beneath the mould-board 16. The furrow slice, indicated by the numeral 22 in Figure 3, shows its position before it has been operated on by the plow 21, and the numeral 23 indicates this same furrow slice after it has been moved by the plow 21 to position under the mould-board 16.

When the plows have been advanced over pasture land the land is left in substantially the position shown in Figure 5. In this figure the numeral 24 indicates the pasture strip at the upper side of the cut formed by the implement, and this is shown inclining upwardly toward the cut edge thereof, 25, so that a water retaining channel is formed between the upper edge of the cut portion 25 and the adjacent portion of the pasture land. Furthermore, the upper edge 26 of the other part of the cut is in position lower than the adjacent portion of the pasture slice toward the right, as shown in Figure 5, and thus a second water retaining channel is formed, and, furthermore, the furrow slice 23 will have been loosened to some extent so that water retained in said channels can readily and easily penetrate the furrow slices and through the furrow slice 23 into the sub-soil beneath.

For the purpose of packing the pasture strips after the plows have performed their functions I have provided at the rear of the frame 10 a frame 27 having supporting wheels 28 and carrying rollers 29 and 30, and these rollers are preferably made of heavy material to thereby firmly pack the surface over which the implement is advanced. The shape of the rollers is such as to press the pasture strips firmly down upon the furrow slice 23 and lift the surface in the position shown in Figure 5 forming two water retaining channels.

In practical operation, and assuming that my improved implement is being used for forming water retaining channels on hillside pasture land, then the operator advances the implement in as nearly a horizontal path of travel as possible, in a direction transverse to the incline of the hill, for the purpose of forming these water retaining channels in as nearly a horizontal position as possible to retain water and not form water conducting channels inclined from the horizontal.

As the implement is being advanced, the cutter first forms a vertical cut in the pasture land, then the two mould-boards elevate the adjacent pasture strips and roll them up at angles of about 45° during the passage of the mould-boards thereunder. During this time the plow 21 cuts a furrow slice from beneath one of the mould-boards and moves it laterally to position under the other mould-board, then when the implement has passed, a furrow slice has been taken from beneath one side of the cut and packed under the sod at the other side of the cut, and finally when the rollers pass over the surface, the sod is pressed down firmly into position forming two substantially horizontally arranged water retaining channels, the top surfaces of which are formed of unbroken, undisturbed pasture land or sod.

Assuming that after the formation of the terraces a normal rainfall occurs, then the rain gathers in the channels and can readily penetrate through the sod into the sub-soil because the surface beneath the sod of the channels has been cut and somewhat loosened by the implement, and thus the sub-soil prepared for easy penetration of the water. When, however, there is an excessive rainfall and the quantity of water is so great that it cannot be retained in the channels, then and in that event the water will run downhill over both channels but will not cause soil erosion because the water runs over unbroken sod or pasture strips.

My improved implement is intended primarily for use in connection with the formation of moisture conserving terraces in pasture land. By the terms "pasture land" and "sod" as herein used, I mean land having such vegetation thereon that, when the furrow slices are elevated by the mould-boards, this vegetation will hold the furrow slices together so that when returned to their original position there will be an unbroken, undisturbed top surface furrow slice, as distinguished from that kind of land in which the mould-boards will break up the land in the same manner as is customary with the ordinary plow.

I claim as my invention:

1. A terracing implement, comprising a frame, a cutter carried by the frame for forming a substantially vertical cut in pasture land over which the implement is being advanced, two mouldboards carried by the frame in the rear of the cutter and shaped to be advanced under the pasture land and to elevate the adjacent cut edge portions thereof and temporarily support them in said positions, and an earth moving implement carried by the frame beneath said mould-boards shaped to move a furrow slice from beneath one of the mould-boards to position beneath the other mould-board.

2. A terracing implement, comprising a frame, a cutter carried by the frame for forming a substantially vertical cut in pasture land over which the implement is being advanced, two mouldboards carried by the frame in the rear of the cutter and shaped to be advanced over the pasture land and to elevate the adjacent cut edge portions thereof and temporarily support them in said positions, an earth moving implement carried by the frame beneath said mould-boards shaped to move a furrow slice from beneath one of the mould-boards to position beneath the other mould-board, the mould-board on the side from which the earth moving implement removes the earth being in a plane higher than that of the mould-board toward which the earth is moved.

3. In an implement of the class described, the combination of two plow shares having their cutting edges extended rearwardly and outwardly in opposite directions, a mould-board for each plow share shaped to elevate the material under which it is passed, to such position that after the implement has passed from beneath the material thus elevated, said material will tend to return by gravity to its original position, and means carried by the implement for moving a furrow slice from beneath one of said mould-boards to position beneath the other said mould-board.

4. In an implement of the class described, the combination of two plow shares having their cutting edges extended rearwardly and outwardly in opposite directions, a mould-board for each plow share shaped to elevate the material under which it is passed, to such position that after the implement has passed from beneath the material thus elevated, said material will tend to return by gravity to its original position, and a plow carried by the implement below the said mouldboard and shaped to cut a furrow slice from beneath one of the mould-boards and move it laterally to position beneath the other mould-board.

5. A terracing implement, comprising a frame to be advanced over the land to be terraced, means carried by the frame for forming a substantially vertical cut in the land, means carried by the frame and extended laterally from both sides of the cutting means and adapted to be advanced under the surface of the land being operated upon for elevating and tilting both adjacent surface portions of the land upwardly and holding them temporarily in said position, and means carried by the frame and in the rear of the said cutting means for moving a portion of the land under said elevating and tilting means laterally.

EDGAR V. COLLINS.